(12) United States Patent
Kang et al.

(10) Patent No.: US 12,722,293 B2
(45) Date of Patent: Sep. 1, 2026

(54) SMART ROBOT TEACHING SYSTEM AND SMART ROBOT TEACHING METHOD

(71) Applicants: Hyundai Motor Company, Seoul (KR); Kia Corporation, Seoul (KR)

(72) Inventors: Kyungmo Kang, Chungju-si (KR); Yoon Soo Kim, Suwon-si (KR); Seung Ho Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 63 days.

(21) Appl. No.: 18/632,913

(22) Filed: Apr. 11, 2024

(65) Prior Publication Data

US 2025/0196343 A1 Jun. 19, 2025

(30) Foreign Application Priority Data

Dec. 14, 2023 (KR) ........................ 10-2023-0182077

(51) Int. Cl.

| | |
|---|---|
| ***B25J 9/16*** | (2006.01) |
| ***B25J 13/00*** | (2006.01) |
| ***G05B 19/4155*** | (2006.01) |
| ***G06F 21/32*** | (2013.01) |
| *B25J 9/00* | (2006.01) |

(52) U.S. Cl.

CPC ............. *B25J 9/1656* (2013.01); *B25J 13/00* (2013.01); *B25J 13/006* (2013.01); *G05B 19/4155* (2013.01); *G06F 21/32* (2013.01); *B25J 9/0081* (2013.01); *B25J 9/1682* (2013.01); *G05B 2219/40408* (2013.01)

(58) Field of Classification Search

CPC ...... B25J 13/006; B25J 9/0084; B25J 9/1682; B25J 9/1669; B25J 13/02; B25J 13/06; G05B 2219/39449; G05B 2219/40408; G05B 19/425; G05B 19/427; G06F 21/32; G07C 9/37; G07C 9/257; G07C 9/32; G07C 9/33

See application file for complete search history.

(56) References Cited

U.S. PATENT DOCUMENTS

| | | | | |
|---|---|---|---|---|
| 6,819,219 | B1 * | 11/2004 | Bolle | G06Q 20/40145 340/5.82 |
| 11,360,757 | B1 * | 6/2022 | Roy | H04L 67/06 |
| 2006/0106471 | A1 * | 5/2006 | Ikeda | B25J 19/06 700/83 |
| 2013/0151010 | A1 * | 6/2013 | Kubota | G05B 19/409 700/264 |
| 2015/0352718 | A1 | 12/2015 | Lee et al. | |
| 2017/0153608 | A1 * | 6/2017 | Ueda | G05B 19/409 |

(Continued)

FOREIGN PATENT DOCUMENTS

| | | |
|---|---|---|
| KR | 101321601 B1 | 10/2013 |
| KR | 101740374 B1 | 5/2017 |

*Primary Examiner* — Khoi H Tran
*Assistant Examiner* — Tanner L Cullen
(74) *Attorney, Agent, or Firm* — Slater Matsil, LLP

(57) ABSTRACT

A smart robot teaching system, and a method thereof, can include a robot control panel connected to a robot, a mobile terminal installed with a robot teaching program creation application based on a robot teaching program for teaching the robot, a virtual network server wirelessly connecting the mobile terminal and the robot control panel, and a robot teaching program operation server configured to operate and manage the robot teaching program.

20 Claims, 11 Drawing Sheets

(56) References Cited

U.S. PATENT DOCUMENTS

| | | | | |
|---|---|---|---|---|
| 2020/0293302 | A1* | 9/2020 | Sato | G06F 9/4881 |
| 2021/0268645 | A1* | 9/2021 | Miyazawa | G05B 19/0426 |
| 2022/0331967 | A1* | 10/2022 | Kimura | B25J 9/1689 |
| 2022/0395978 | A1* | 12/2022 | Sherrod | B25J 9/1653 |
| 2024/0149446 | A1* | 5/2024 | Tomiie | B25J 9/1656 |
| 2024/0399566 | A1* | 12/2024 | Taniguchi | B25J 9/1605 |

* cited by examiner 100
140
VPN
130
US1
US2
US3
11
11
11
11
11
10
150
RMS
160
12
110
RB
120

SMART ROBOT TEACHING SYSTEM AND SMART ROBOT TEACHING METHOD

CROSS-REFERENCE TO RELATED APPLICATIONS

This application claims the benefit of Korean Patent Application No. 10-2023-0182077, filed on Dec. 14, 2023, which application is hereby incorporated herein by reference.

TECHNICAL FIELD

The present disclosure relates to a smart robot teaching system.

BACKGROUND

Finished car factories are continuously expanding the use of manned and unmanned automated processes for many reasons, such as improving productivity and quality, resolving manpower shortages due to aging, and preventing the occurrence of musculoskeletal diseases.

The most important equipment in configuring an automated line is a robot, and as the use of the robot increases, robot equipment should be managed efficiently and failure response should be done promptly when robot equipment abnormalities occur to prevent a decrease in profitability due to a decrease in equipment operation rate.

However, in the case of current robots, a teaching pendant, which is an input device that may input and modify the movement of the robot, is wired to each individual robot, so there is a problem in that the large amount of equipment needs to be managed, and when a robot breaks down, if a robot teaching expert is not on site, a failure response is delayed.

SUMMARY

The present disclosure relates to a smart robot teaching system and a smart robot teaching method, and more particularly, to a smart robot teaching system and a smart robot teaching method that wirelessly and remotely teaches a robot using a mobile terminal.

Some embodiments of the present disclosure can provide a smart robot teaching system and a smart robot teaching method that resolve time and space constraints through wireless remote robot teaching program control and are safe and easy to manage through distributed backup storage of a robot teaching program.

Some embodiments of the present disclosure can provide a smart robot teaching system and a smart robot teaching method that enables creation and modification of a robot teaching program remotely through a teaching program creation application installed on a mobile terminal, and are safe and easy to manage by storing the robot teaching program as a backup in a plurality of mobile terminals.

According to an embodiment, a smart robot teaching system can include a robot control panel that is connected to a robot, a mobile terminal that is installed with a robot teaching program creation application based on a robot teaching program for teaching the robot, a virtual network server that wirelessly connects the mobile terminal and the robot control panel, and a robot teaching program operation server that operates and manages the robot teaching program.

The robot may be provided in plurality, and may further include a network hub connecting a plurality of robot control panels connected to the plurality of robots, respectively, to the virtual network server and the robot teaching program operation server.

The smart robot teaching system may further include a network camera that monitors an operating state of the robot in real time, in which the network camera may be connected to the mobile terminal, and a position and angle of the network camera may be adjusted according to manipulation of a user through the mobile terminal.

The virtual network server may include a virtual private network (VPN) server dedicated to robot teaching, and the VPN server dedicated to the robot teaching may store a serial number of the mobile terminal and biometric signal recognition data of a user who has authority to use the mobile terminal that matches the serial number.

The VPN server dedicated to the robot teaching may confirm whether biometric signal recognition data of a user recognized through the biometric signal recognition of the user accessing the robot teaching program matches the serial number of the mobile terminal based on the robot teaching program creation application of the mobile terminal, and only when the serial number of the mobile terminal matches the biometric signal recognition data of the user, the user may be allowed to access the robot teaching program.

The robot teaching program operation server may assign a role with specific work authority to each user who has authority to access the mobile terminal, the role may be selected from a teaching expert who has authority to create and modify the robot teaching program and to inquire a change history of the robot teaching program and a robot operation error occurrence status, a middle manager who has the authority to inquire the change history of the robot teaching program and the robot operation error occurrence status, and a field worker who only have the authority to inquire the robot operation error occurrence status.

The robot teaching program operation server may be connected to a manufacturer server of the robot and provide a robot operation update and a failure response manual provided in real time from the manufacturer server to the robot teaching program.

The robot teaching program operation server may store the robot teaching program in each of the plurality of robot control panels through the network hub.

The mobile terminal may be provided in plurality, and the robot teaching program operation server may backup and store the robot teaching program in each of the plurality of mobile terminals in real time.

When a new robot teaching program is created or modified, the robot teaching program operation server may automatically update and manage a change history of which of multiple users creates or modifies the robot teaching program and whether the robot teaching program for which of the plurality of robots is changed.

According to an embodiment, a smart robot teaching method can include, when a biometric signal of a user is recognized by a mobile terminal, determining whether a serial number assigned to the mobile terminal matches biometric signal recognition data of the user, activating a robot teaching program when the serial number and the biometric signal recognition data match each other, and when the user selects a target robot through a robot teaching program creation application of the mobile terminal and selects a creation or modification menu of the robot teaching program for the target robot, creating or modifying the robot teaching program for the target robot in a robot teaching program operation server.

The smart robot teaching method may further include automatically storing a change history of the robot teaching program created or modified in the robot teaching program operation server, in which the change history may include a date and contents of the creation or modification of the robot teaching program, and information on the user who creates or modifies the robot teaching program.

The smart robot teaching method may further include automatically backing up and storing the change history in the mobile terminal.

The smart robot teaching method may further include transmitting and storing the created and modified final version of robot teaching program to a plurality of mobile terminals and a plurality of robot control panels.

The activating of the robot teaching program may include detecting a role assigned to the user who is allowed to access the robot teaching program through matching the biometric signal recognition data, and determining whether to activate the creation or modification menu of the robot teaching program based on the detected role.

The role may include a teaching expert who has authority to create and modify the robot teaching program and to inquire a change history of the robot teaching program and a robot operation error occurrence status, a middle manager who has the authority to inquire the change history of the robot teaching program and the robot operation error occurrence status, and a field worker who only have the authority to inquire the robot operation error occurrence status.

The smart robot teaching method may further include activating the creation or modification menu of the robot teaching program when the role of the user is detected as the teaching expert.

The robot control panel of the robot and the mobile terminal may be connected through a VPN server dedicated to teaching.

The smart robot teaching method may further include providing a robot operation update and a failure response manual provided in real time from a manufacturer server of the robot to the robot teaching program.

The smart robot teaching method may further include monitoring an operating state of the robot in real time through a network camera connected to the mobile terminal.

According to a smart robot teaching system and smart robot teaching method according to an embodiment of the present disclosure, it can be possible to shorten a failure response time when a line interruption occurs due to the loss or modification of the robot teaching program.

According to a smart robot teaching system and smart robot teaching method according to an embodiment of the present disclosure, by using the biometric signal recognition function of the mobile terminal and the multi-distributed backup system of the robot teaching program, it can be possible to prevent the loss or error of the robot teaching program from occurring.

DETAILED DESCRIPTION OF ILLUSTRATIVE EMBODIMENTS

Figure 1:
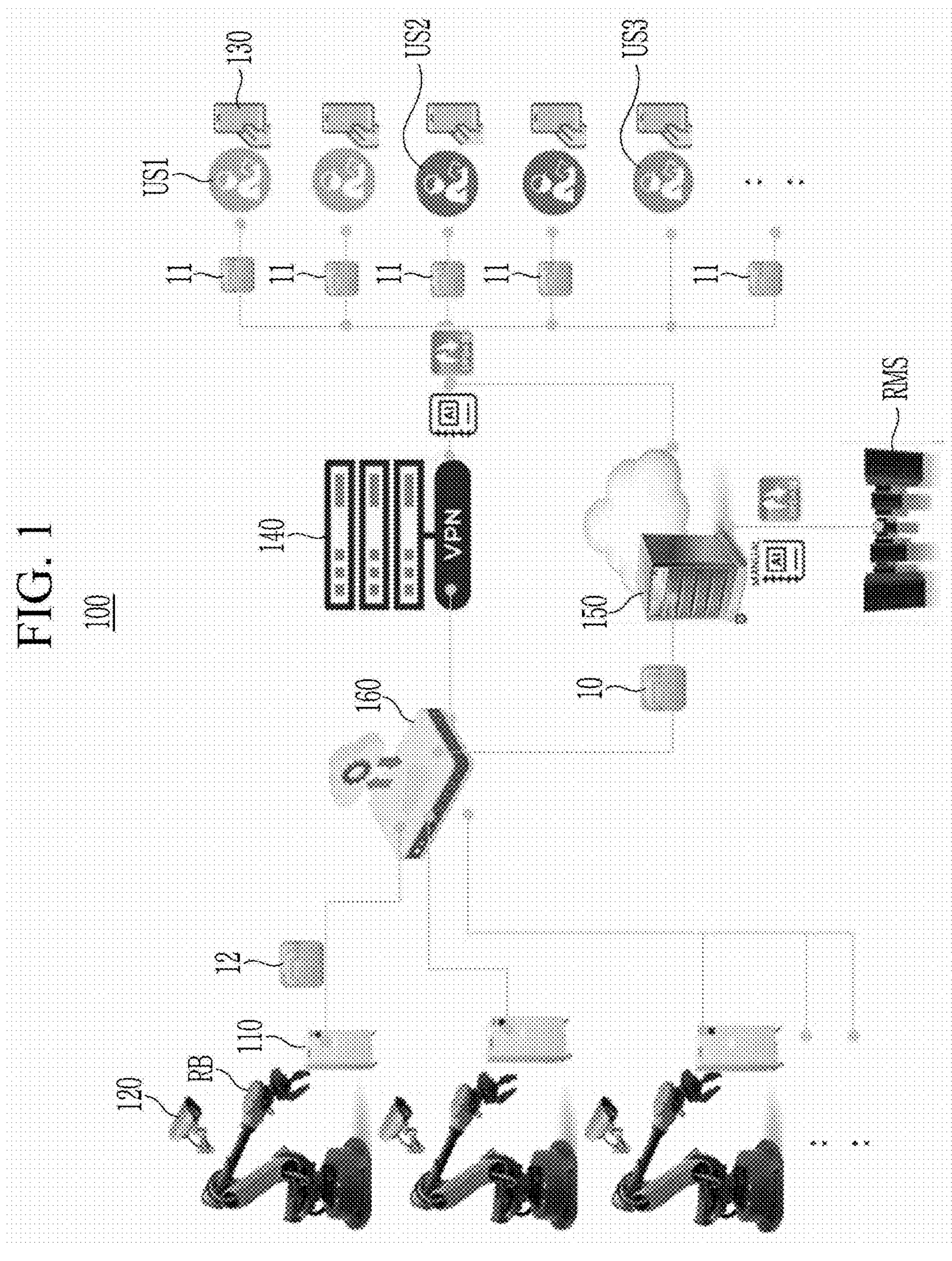
FIG. 1 is a diagram illustrating a smart robot teaching system according to an embodiment of the present disclosure.

Hereinafter, example embodiments of the present disclosure will be described more fully with reference to the accompanying drawings so as to be easily practiced by those skilled in the art to which the present disclosure pertains. As those skilled in the art can realize, the described example embodiments may be modified in various different ways without departing from the spirit or scope of the present disclosure. Accordingly, the drawings and description are to be regarded as illustrative in nature and not necessarily restrictive. Like reference numerals can designate like elements throughout the specification.

Throughout the specification and claims, unless explicitly described to the contrary, the word "comprise" and variations such as "comprises" or "comprising," can be understood to imply the inclusion of stated elements but not the exclusion of any other elements.

Terms including an ordinal number such as "first," "second," etc., may be used to describe various components, but the components are not necessarily limited by such terms. The above terms can be used solely for the purpose of distinguishing one component from another.

Terms such as " . . . unit," . . . er/or," and "module" used in the specification may mean a unit capable of processing at least one function or operation described in the specification, which may be implemented as hardware or a circuit, software, or a combination of hardware or circuit and software.

Hereinafter, some example embodiments of the present disclosure will be described with reference to the drawings.

FIG. 1 is a diagram illustrating a smart robot teaching system according to an embodiment of the present disclosure. The smart robot teaching system can include a smart robot teaching system. The smart robot teaching system can include a system for remote wireless robot teaching using a mobile terminal.

Referring to FIG. 1, a smart robot teaching system 100 can include a robot control panel 110, a network camera 120, a mobile terminal 130, a virtual network server 140, a robot teaching program operation server 150, and a network hub 160, any combination of or all of which may be in plural or may include plural components thereof.

The robot control panel 110 can be connected to a robot (RB). The robot control panel 110 may correspond to a device or system used to manipulate or control the robot (RB). As illustrated, the robot control panel 110 may be provided in plurality to control each of the plurality of robots (RBs).

The network camera 120 may monitor an operating state of the robot in real time. The network camera 120 may be connected to the mobile terminal 130, and its position and angle may be adjusted according to manipulation of a user through the mobile terminal 130.

The mobile terminal 130 can be installed with a robot teaching program creation application based on the robot teaching program 10 for teaching the robot (RB). That is, a user may create or modify the robot teaching program 10 through the robot teaching program creation application of the mobile terminal 130.

The mobile terminal 130 may be provided in plurality. Each of the plurality of mobile terminals 130 can include a serial number. Each of the plurality of mobile terminals 130 may allow access to the robot teaching program 10 only to users matching the serial number.

The virtual network server 140 may wirelessly connect the mobile terminal 130 to the robot control panel 110. The virtual network server 140 can include a virtual private network (VPN) server dedicated to robot teaching. The VPN server dedicated to robot teaching can store the serial number of the mobile terminal and biometric signal recognition data of a user who has authority to use the mobile terminal that matches the serial number.

The biometric signal may include all of user's bio information, such as user's face, fingerprint, voice, and iris. The biometric signal recognition data may be data including information on the biometric signal of the user. For example, when the user's fingerprint is recognized, fingerprint recognition data may be generated.

The VPN server dedicated to the robot teaching may confirm whether the biometric signal recognition data of the user recognized through the biometric signal recognition for the user accessing the robot teaching program 10 matches the serial number of the mobile terminal 130 based on the robot teaching program creation application of the mobile terminal 130.

The VPN server dedicated to the robot teaching may allow a user to access the robot teaching program 10 through the mobile terminal 130 only when the serial number matches the biometric signal recognition data of the user.

The robot teaching program operation server 150 may operate and manage the robot teaching program 10.

The robot teaching program operation server 150 may assign a role with specific work authority to each user who is allowed to access the mobile terminal 130.

The role may be divided into a plurality of roles with different scopes of work authority.

For example, the role assigned to the user may include a teaching expert US1 who has authority to create and modify the robot teaching program 10 and to inquire a change history of the robot teaching program 10 and a robot operation error occurrence status, a middle manager US2 who has the authority to inquire the change history of the robot teaching program 10 and the robot operation error occurrence status, and a field worker US3 who only have the authority to inquire the robot operation error occurrence status.

The robot teaching program operation server 150 may selectively assign one role among the teaching expert US1, the middle manager US2, and the field worker US3 to the user.

The robot teaching program operation server 150 may be connected to a manufacturer server (RMS) of the robot (RB). The robot teaching program operation server 150 may provide the robot teaching program 10 with robot operation updates and failure action manuals provided in real time from the manufacturer server (RMS).

The robot teaching program operation server 150 may store the robot teaching program 12 in each of the plurality of robot control panels 110 through the network hub 160.

When the robot teaching program 10 is newly created or modified, the robot teaching program operation server 150 may automatically update and manage a change history of which of multiple users creates or modifies the robot teaching program 10 and whether the robot teaching program 10 for which of the plurality of robots is changed.

When the robot teaching program 10 is newly created or modified, the robot teaching program operation server 150 may provide an alarm for the occurrence of the new creation or modification of the robot teaching program 10 to the user.

The robot teaching program operation server 150 may backup and store the updated robot teaching program 11 in each of the plurality of mobile terminals 130 in real time.

The network hub 160 may connect the plurality of robot control panels 110 connected to the plurality of robots (RB) to the virtual network server 140 and the robot teaching program operation server 150.

Figure 2:
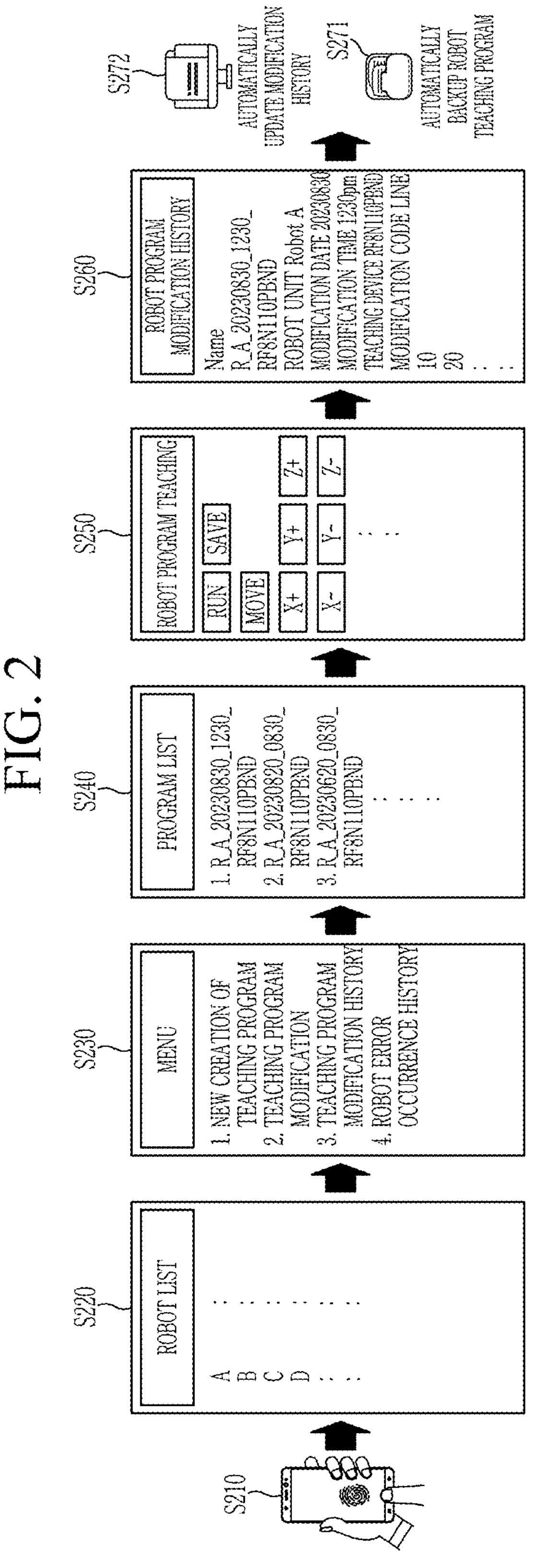
FIG. 2 is a diagram illustrating a change history management flow of a robot teaching program through the smart robot teaching system according to an embodiment of the present disclosure.

FIG. 2 is a diagram illustrating a change history management flow of a robot teaching program through the smart robot teaching system according to an embodiment of the present disclosure. FIG. 2 illustrates a smart robot teaching method through the smart robot teaching system 100 (see FIG. 1) from the user's perspective through a screen of the mobile terminal 130 (see FIG. 1).

In FIG. 2, when the biometric signal of the user is recognized by the mobile terminal 130, the smart robot teaching system 100 can determine whether the serial number assigned to the mobile terminal 130 matches the biometric signal recognition data of the user (operation S210).

The smart robot teaching system 100 can activate the robot teaching program when the serial number and the biometric signal recognition data match each other.

The smart robot teaching system 100 can provide the user with an interface for creating or modifying a teaching program through the robot teaching program creation application (hereinafter referred to as application) of the mobile terminal 130. The user may select a robot to be created or modified through the robot teaching program creation application (operation S220).

The smart robot teaching system 100 can provide a user with menus for newly creating and modifying the teaching program, inquiring a modification history, and inquiring a robot error occurrence history through the application (operation S230). The smart robot teaching system 100 may provide a limited menu based on the role of the connected user and work authority according to the role. For example, the user may select a modification menu of the teaching program.

When the user selects a menu, the smart robot teaching system 100 may be wirelessly and remotely connected to the robot teaching program operation server for creating, modifying, and managing the teaching program through a VPN server dedicated to the robot teaching.

The smart robot teaching system 100 can provide a selection menu through which the user may select the robot teaching program the user wants to modify, and the user may select the robot teaching program the user wants to modify among the plurality of robot teaching programs for the plurality of robots (operation S240).

The smart robot teaching system 100 can provide a teaching menu for the selected robot teaching program, and the user may remotely modify the robot teaching program using the mobile terminal 130 (operation S250).

The smart robot teaching system 100 may store and upload the modified robot teaching program to the robot teaching program operation server.

The smart robot teaching system 100 may automatically update a change history including a modification worker, a modification date, and modification contents of the robot teaching program through the modification to a change history management file on the robot teaching program operation server (operation S260).

The smart robot teaching system 100 may automatically copy and transmit the change history management file of the updated robot teaching program to the plurality of mobile terminals (operation S271).

The smart robot teaching system 100 may update the updated final version of robot teaching program to the plurality of mobile terminals and the plurality of robot control panels and complete the task performance (operation S272).

Figure 3:
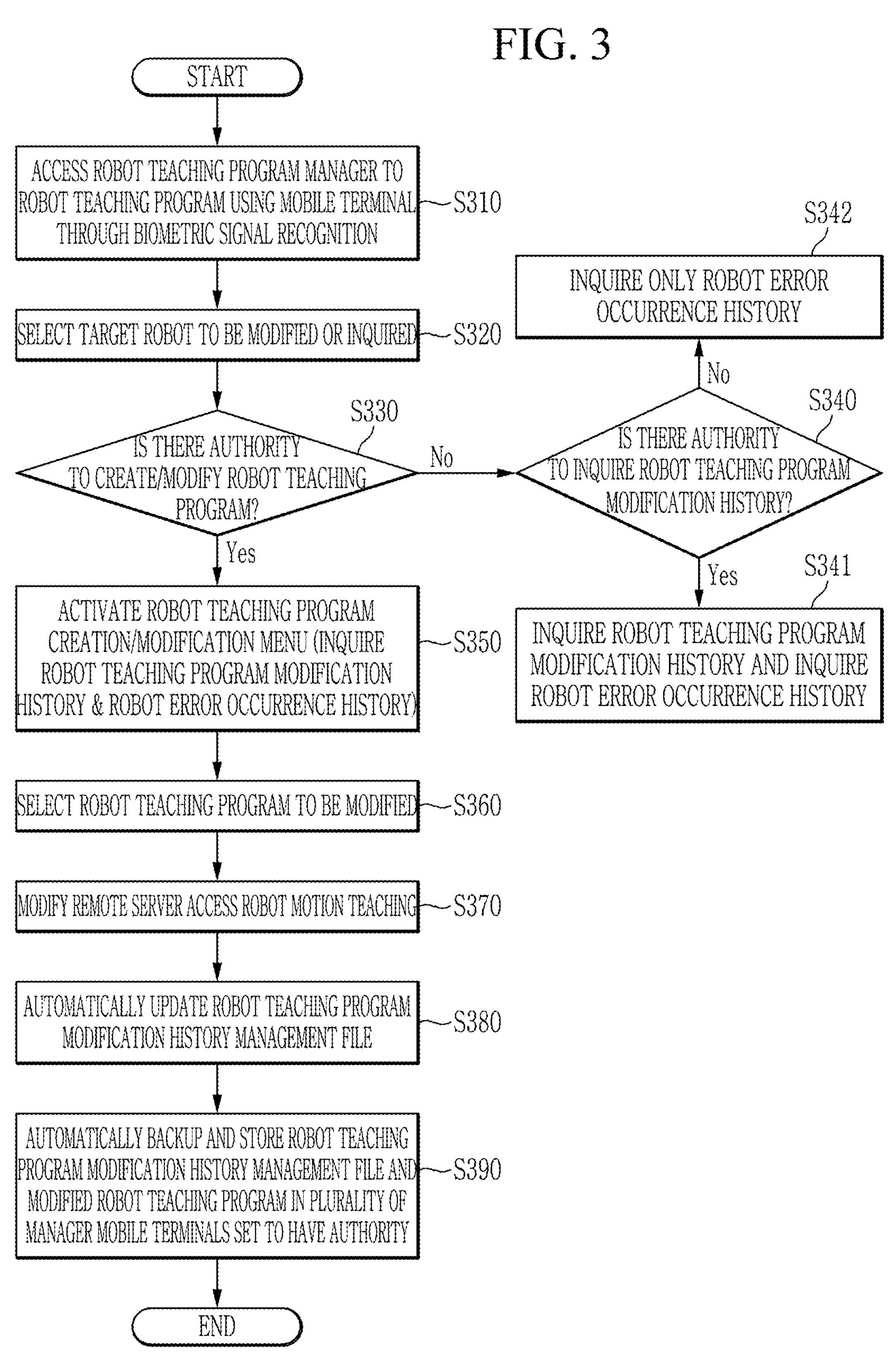
FIG. 3 is a flowchart illustrating a smart robot teaching method according to an embodiment of the present disclosure.

FIG. 3 is a flowchart illustrating a smart robot teaching method according to an embodiment of the present disclosure. The smart robot teaching method of FIG. 3 may be performed through a smart robot teaching system. For example, the smart robot teaching method may be performed through the robot teaching program operation server. For example, the description will be made with reference to FIG. 1. Descriptions that overlap with those of FIG. 2 can be omitted.

In FIG. 3, the smart robot teaching system 100 may allow access to the robot teaching program 10 of the user through the biometric signal recognition of the mobile terminal 130 (operation S310). For example, the smart robot teaching system 100 may allow the user to access the robot teaching program 10 through fingerprint recognition, facial recognition, or iris recognition of the mobile terminal 130.

The smart robot teaching system 100 may select a target robot to create, modify, or inquire according to the operation through the application of the mobile terminal 130 of the user (operation S320).

The smart robot teaching system 100 may detect the role assigned to the user who accesses the robot teaching program 10 through the biometric signal recognition. The smart robot teaching system 100 may determine whether to activate the creation or modification menu of the robot teaching program based on the detected role (operations S330 and S340).

The smart robot teaching system 100 may assign, to the user, one role selected from the teaching expert US1 who has authority to create and modify the robot teaching program and to inquire the change history of the robot teaching program and the robot operation error occurrence status, the middle manager US2 who has the authority to inquire the change history of the robot teaching program and the robot operation error occurrence status, and the field worker US3 who only have the authority to inquire the robot operation error occurrence status.

For example, when the detected role of the user is the middle manager US2 (operation S340), the smart robot teaching system 100 can inquire the modification or change history of the robot teaching program 10, activate an inquiry menu for the robot error occurrence history and deactivate the creation/modification menu (operation S341).

When the detected role of the user is the field worker US3, the smart robot teaching system 100 can activate only the robot error occurrence history inquiry menu and deactivate the rest (operation S342).

When the detected role of the user is the teaching expert US1, the smart robot teaching system 100 may activate the creation/modification menu of the robot teaching program 10 (operation S350). In this case, the smart robot teaching system 100 may also activate the modification or change history inquiry of the robot teaching program and the inquiry menu of the robot error occurrence history.

The smart robot teaching system 100 may select the robot teaching program of the target robot to be created or modified from the creation/modification menu according to the manipulation of the user through the mobile terminal 130 (operation S360).

The smart robot teaching system 100 may perform teaching of a robot motion on the robot teaching program operation server by reflecting the modifications performed remotely by the user through the mobile terminal 130 (operation S370).

The smart robot teaching system 100 may automatically update the modification history of the robot teaching program in the management file (operation S380).

When the robot teaching program is newly created or modified, the smart robot teaching system 100 may provide a user with an alarm for the occurrence of the new creation or modification of the robot teaching program.

The smart robot teaching system 100 may automatically backup and store the management file of the modification history of the robot teaching program and the modified robot teaching program in the plurality of mobile terminals of the authorized user (operation S390).

Figure 4:
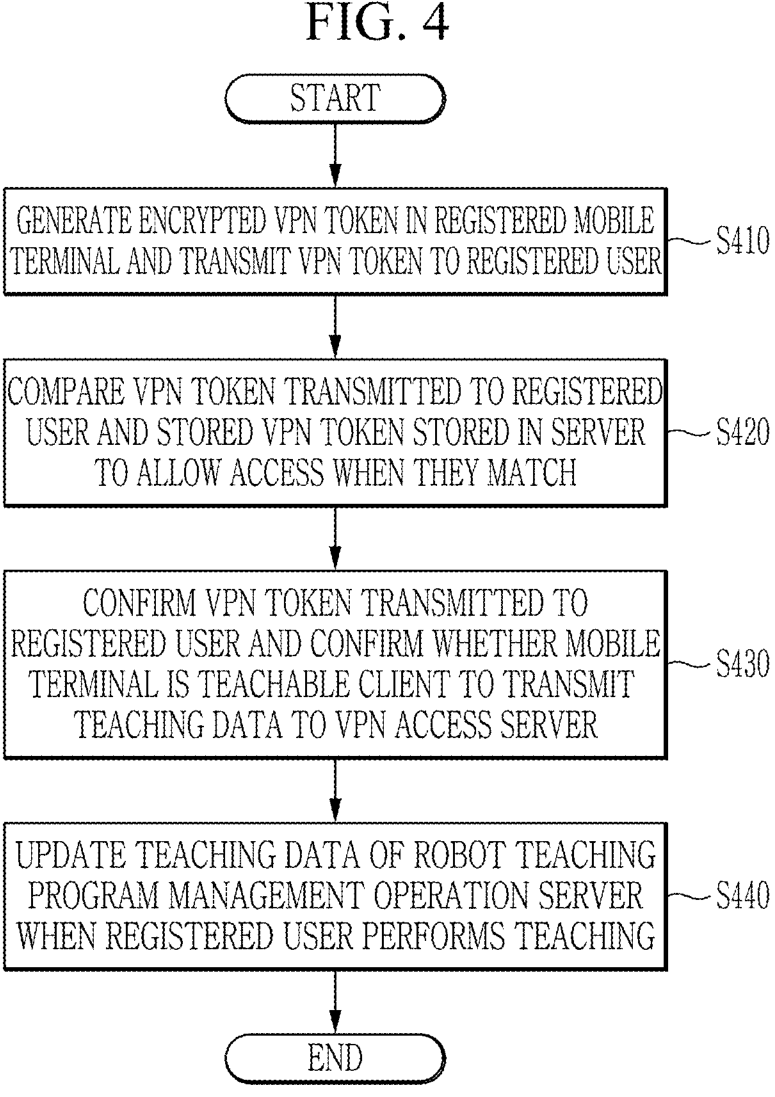
FIG. 4 is a flowchart of an operation of a virtual network server of a smart robot teaching system according to an embodiment of the present disclosure.

FIG. 4 is a flowchart of an operation of a virtual network server of a smart robot teaching system according to an embodiment of the present disclosure. The virtual network server 140 can include the VPN server dedicated to the robot teaching and may store the serial number of the mobile terminal and the biometric signal recognition data of the user matching the serial number.

In an embodiment, the virtual network server 140 may generate an encrypted VPN token in the registered mobile terminal and transmit the VPN token to the registered user (operation S410).

The virtual network server 140 can compare the VPN token transmitted to the registered user with the VPN token stored by the virtual network server to allow user's access when they match (operation S420).

The virtual network server 140 may confirm the VPN token transmitted to the registered user to confirm whether the mobile terminal and the connected user can have authority to create/modify the robot teaching program and transmit the robot teaching program through the VPN (operation S430).

The virtual network server 140 may update the robot teaching program of the robot teaching program operation server for the creation/modification of the robot teaching program by the authorized user (operation S440).

Figure 5:
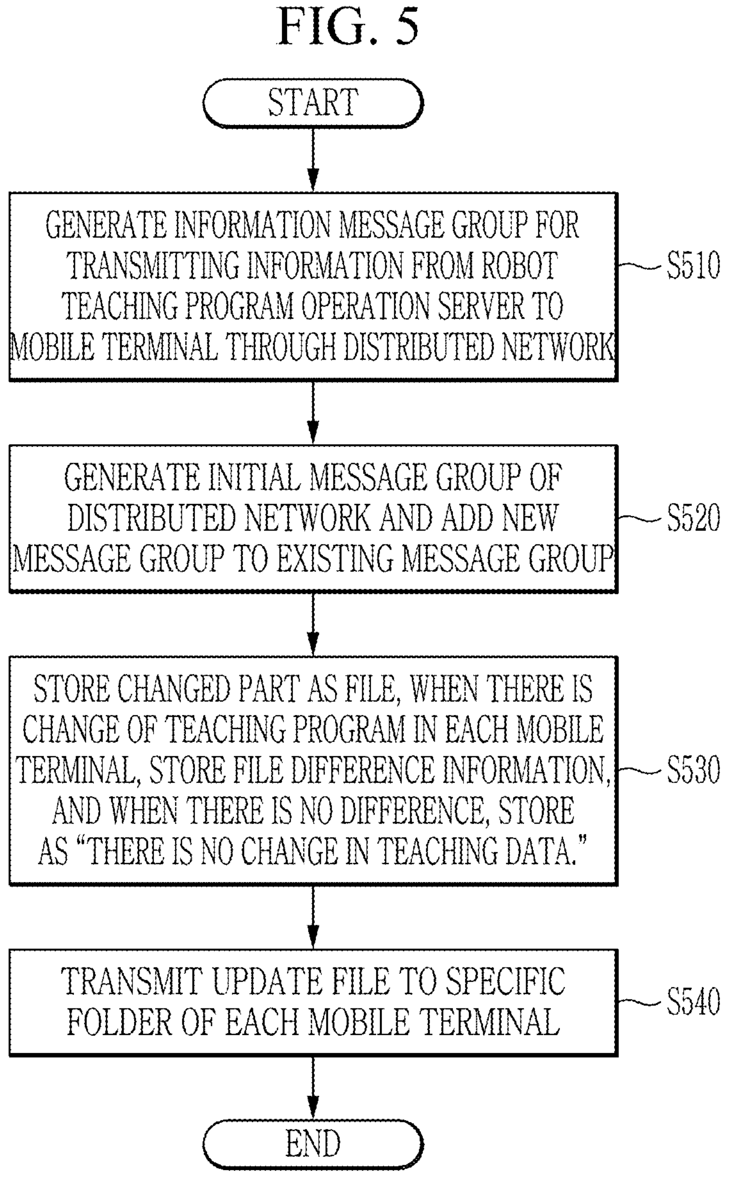
FIG. 5 is a flowchart of an operation of a robot teaching program operation server of a smart robot teaching system according to an embodiment of the present disclosure.

FIG. 5 is a flowchart of an operation of a robot teaching program operation server of a smart robot teaching system according to an embodiment of the present disclosure.

The robot teaching program operation server 150 may generate an information message group for transmitting information to a plurality of mobile terminals through a distributed network (operation S510). The information may include data related to the modification/creation of the robot teaching program.

The robot teaching program operation server 150 may create an initial message group of the distributed network and add a new message group to the existing message group (operation S520).

The robot teaching program operation server 150 can store the changed part of the robot teaching program as a file, store the difference if there is a difference from the teaching program transmitted to each mobile terminal, and store the information that there is no change in the teaching data if there is no difference (operation S530).

The robot teaching program operation server 150 may transmit an update file including the differences to a specific folder of each mobile terminal (operation S540).

Figure 6:
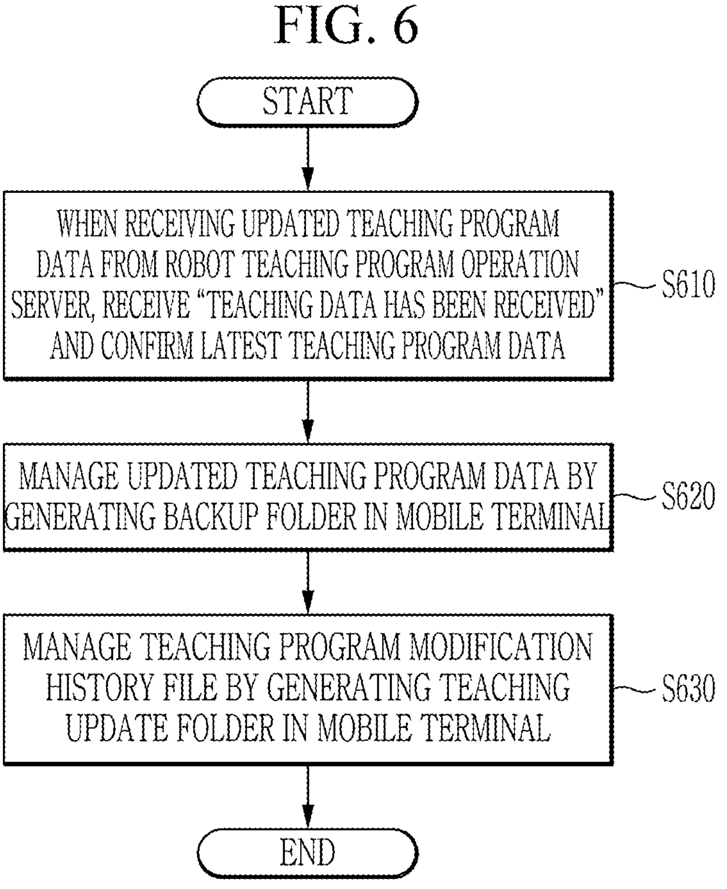
FIG. 6 is a flowchart of teaching program management of a mobile terminal of the smart robot teaching system according to the embodiment of the present disclosure.

FIG. 6 is a flowchart of a teaching program management method of a mobile terminal of a smart robot teaching system according to an embodiment of the present disclosure.

When the mobile terminal 130 receives the updated teaching program data from the robot teaching program operation server, the mobile terminal 130 may receive the message "Teaching data has been received" and confirm the latest teaching program data (operation S610).

The mobile terminal 130 may manage the updated robot teaching program data by generating the backup folder in the mobile terminal (operation S620).

The mobile terminal 130 may manage the modification history file of the robot teaching program by generating a teaching update folder in the mobile terminal (operation S630).

Figure 7:
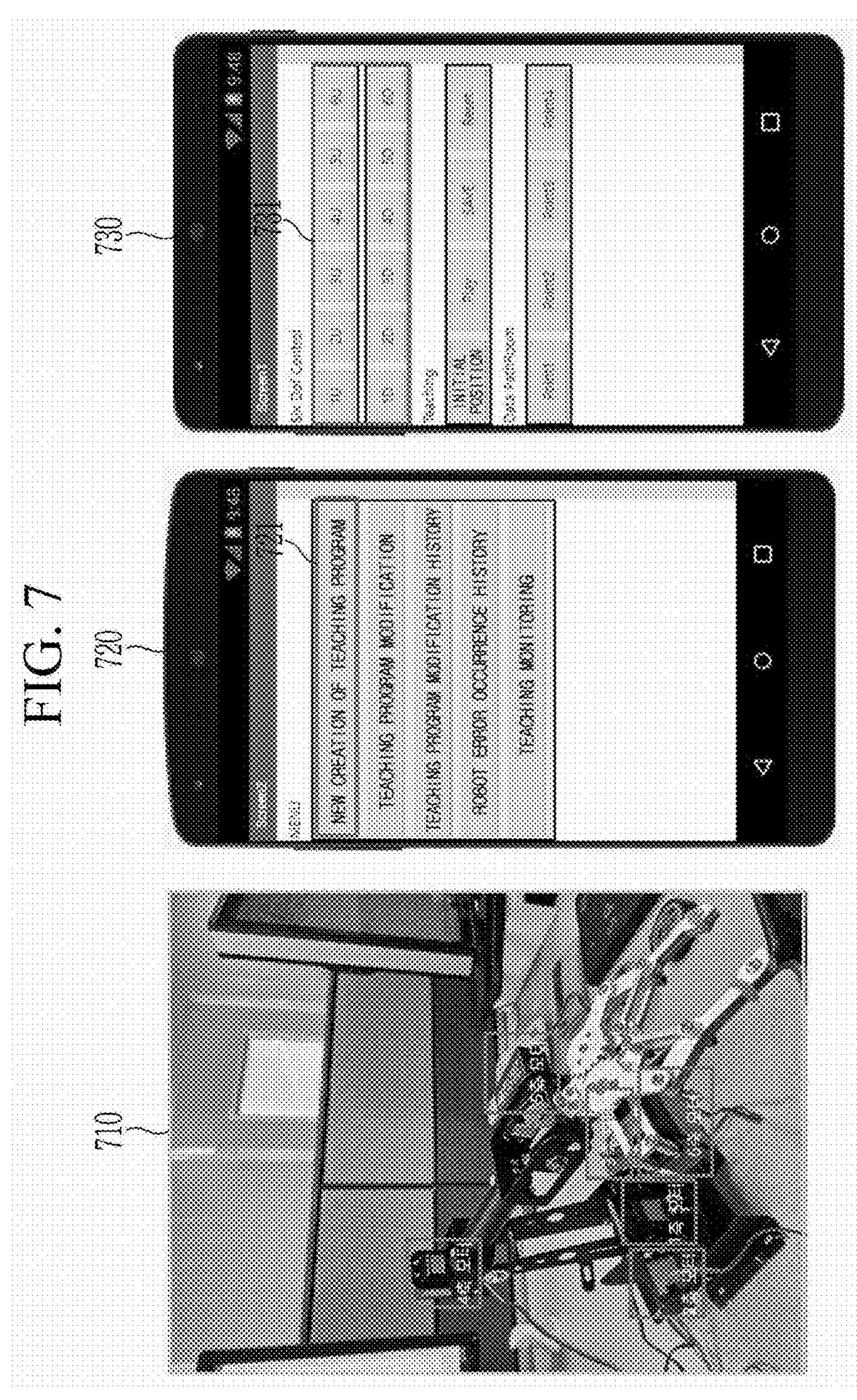
FIG. 7 is a diagram illustrating a robot and robot teaching program creation application according to an embodiment of the present disclosure.

FIG. 7 is a diagram illustrating a robot and robot teaching program creation application according to an embodiment of the present disclosure.

In FIG. 7, the robot 710 may include first to sixth axis motors. A first screen 720 and a second screen 730 of the mobile terminal can each show an interface of the robot teaching program creation application.

The first screen 720 can show an interface including the menu that can include the creation and modification of the robot teaching program, the modification history inquiry, the error occurrence history inquiry, and the like. The second screen 730 can show an interface including a new creation menu that appears when a user selects a new creation button 721 of the robot teaching program through the interface of the first screen 720. For example, when the user selects the control button 731 for each axis on the second screen 730, each axis of the robot 710 may be controlled according to the selected command. In the second screen 730, 1U to 6U may be angle increase commands for first to sixth axes, respectively, and 1D to 6D may be angle decrease commands for first to sixth axes. The control angle may be preset.

Figure 8A:
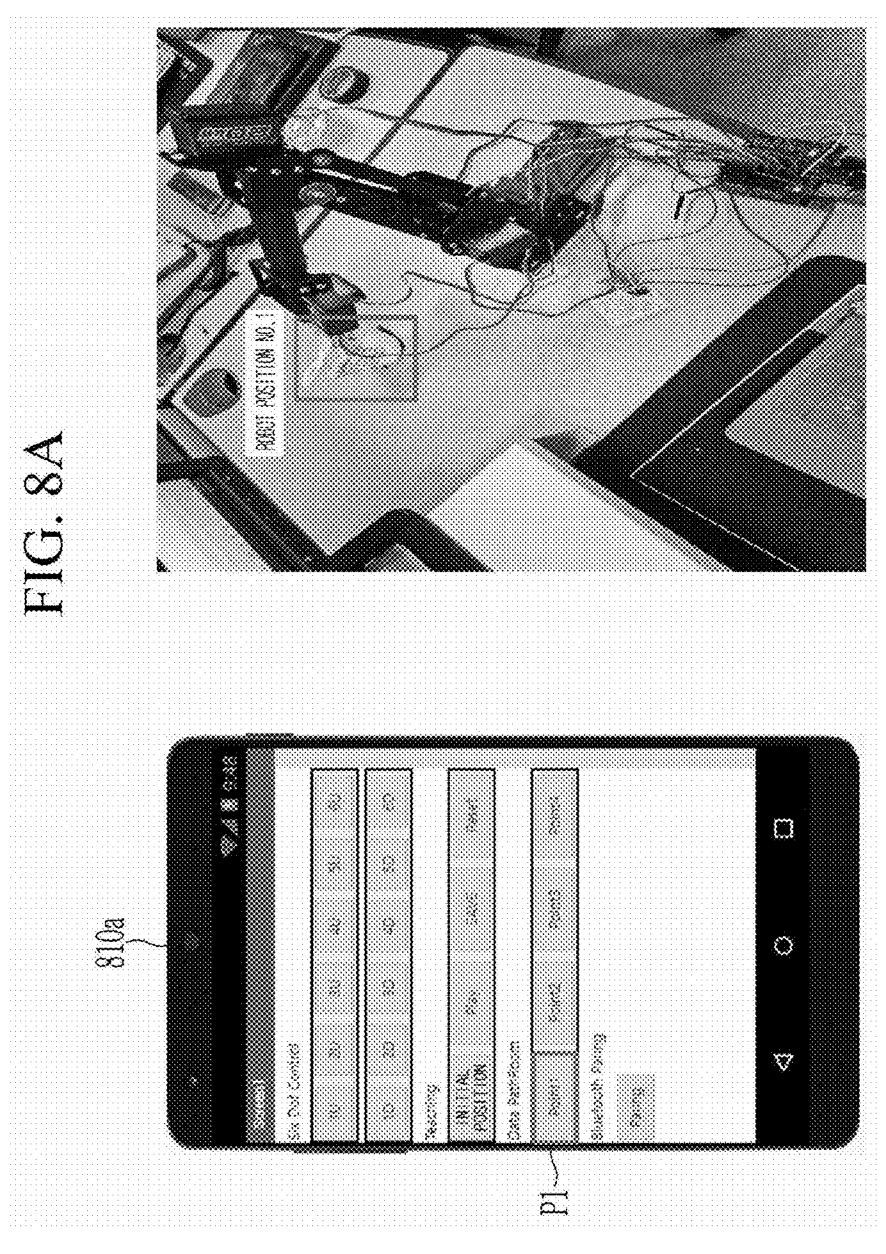
FIGS. 8A to 8C are diagrams illustrating a robot and robot teaching program creation application according to an embodiment of the present disclosure.
Figure 8B:
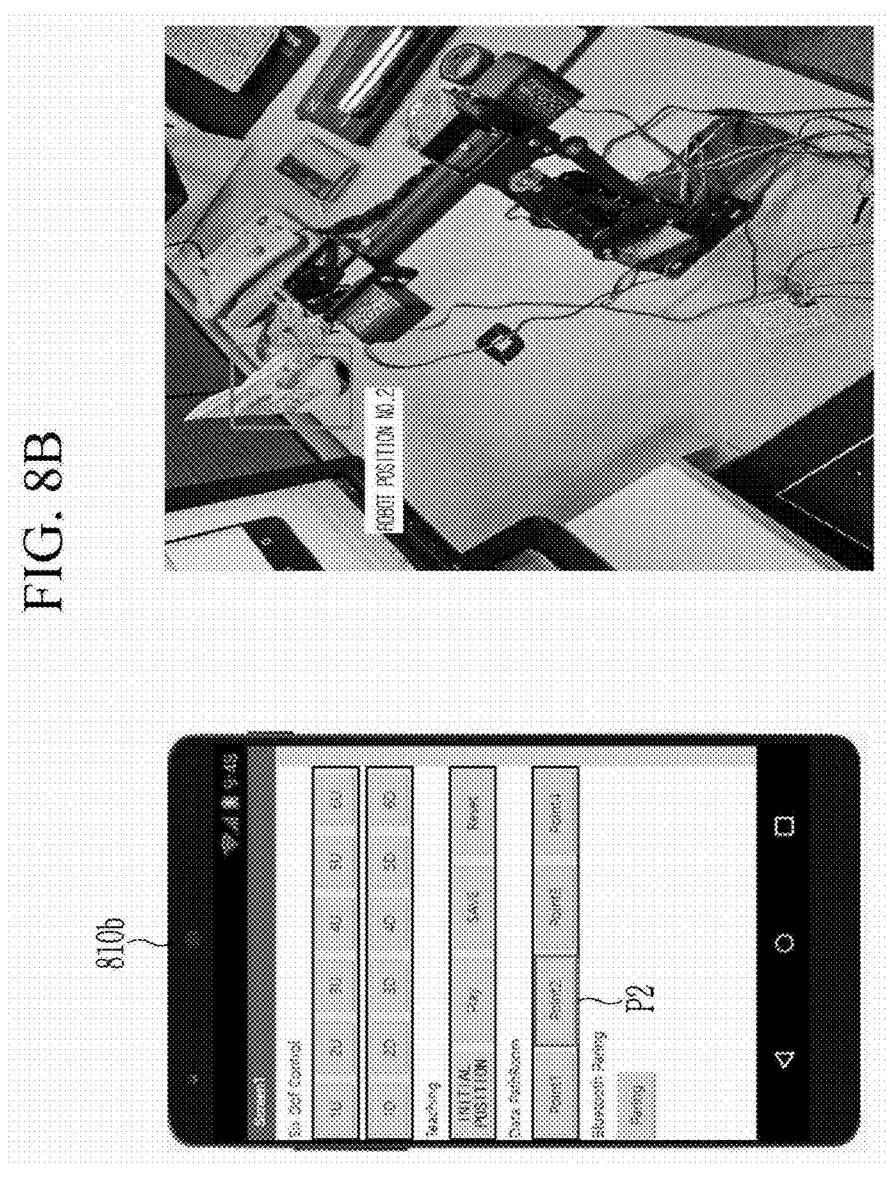
Figure 8C:
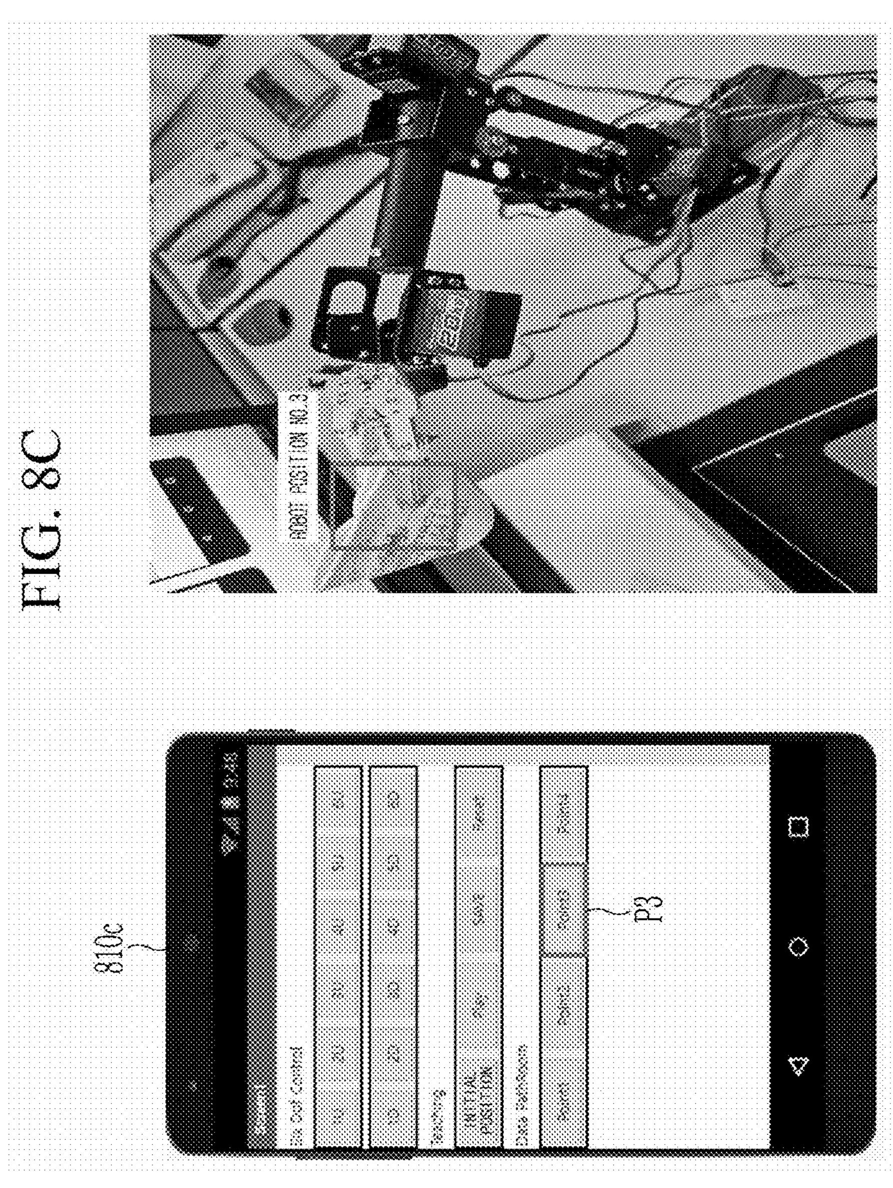

FIGS. 8A to 8C are diagrams illustrating a robot and robot teaching program creation application according to an embodiment of the present disclosure.

In FIG. 8A, when a user clicks point 1 (P1) on an interface 810*a*, a position of the first axis may be stored. In other words, when a user moves the position of the first axis of the robot to a specific position through the angle control of the 1U and 1D and then clicks point 1 (P1), the position of the first axis can be stored as a specific position.

In FIG. 8B, when a user clicks point 2 (P2) on an interface 810*b*, a position of the second axis may be stored. In other words, when a user moves the position of the second axis of the robot to a specific position through the angle control of the 2U and 2D and then clicks the point 2 (P2), the position of the second axis can be stored as a specific position.

In FIG. 8C, when a user clicks point 3 (P3) on an interface 810*c*, a position of a third axis may be stored. In other words, when a user moves the position of the third axis of the robot to a specific position through the angle control of the 3U and 3D and then clicks point 3 (P3), the position of the third axis can be stored as a specific position.

Figure 9:
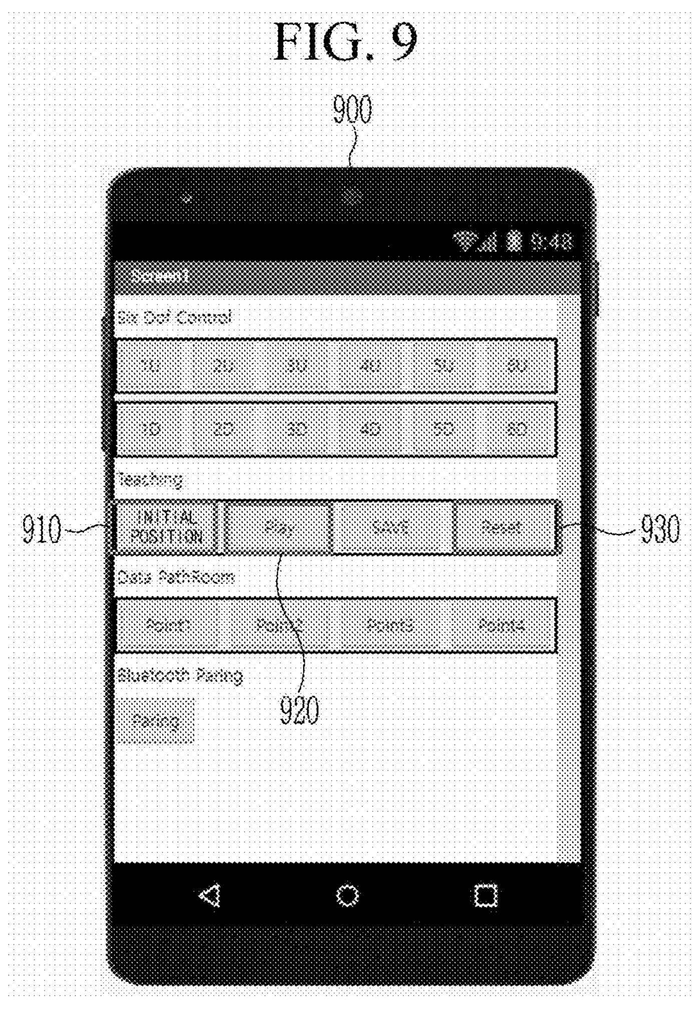
FIG. 9 is a diagram illustrating a robot teaching program creation application according to an embodiment of the present disclosure.

FIG. 9 is a diagram illustrating a robot teaching program creation application according to an embodiment of the present disclosure.

In FIG. 9, when the user selects a play button 920 through an interface 900, the smart robot teaching system may implement an operation in which each axis of the robot moves to designated specific positions, respectively.

When the user selects an initial position button 910 through the interface 900, the smart robot teaching system may move each axis of the robot to its original position before operation.

When the user selects a reset button 930 through the interface 900, the smart robot teaching system may delete and initialize teaching history data for specific positions designated for each axis of the robot.

Although some example embodiments of the present disclosure have been described in detail hereinabove, the scope of the present disclosure is not necessarily limited thereto, but may include several modifications and alterations made by those skilled in the art to which the present disclosure pertains, as defined in the claims.

What is claimed is:

1. A robot teaching system, comprising:

a robot control panel connected to a robot;

a mobile terminal installed with a robot teaching program creation application based on a robot teaching program for teaching the robot;

a virtual network server wirelessly connecting the mobile terminal and the robot control panel; and a robot teaching program operation server configured to operate and manage the robot teaching program, wherein the robot teaching program operation server is configured to assign a role with specific work authority to each user having authority to access the mobile terminal, wherein the role is selected from a teaching expert having authority to create and modify the robot teaching program and to inquire a change history of the robot teaching program and a robot operation error occurrence status, a middle manager having authority to inquire the change history of the robot teaching program and the robot operation error occurrence status, and a field worker having only authority to inquire the robot operation error occurrence status.

2. The system of claim 1, wherein the robot is provided in plurality, and wherein the system further comprises:

robot control panels connected to the plurality of robots, respectively;

a network hub connecting the robot control panels to the virtual network server and the robot teaching program operation server.

3. The system of claim 2, wherein the robot teaching program operation server is configured to store the robot teaching program in each of the robot control panels through the network hub.

4. The system of claim 1, further comprising a network camera configured to monitor an operating state of the robot in real time, wherein the network camera is connected to the mobile terminal, and wherein a position and an angle of the network camera are adjusted according to manipulation of a user through the mobile terminal.

5. The system of claim 1, wherein the virtual network server includes a virtual private network (VPN) server dedicated to robot teaching, wherein the VPN server is configured to store a serial number of the mobile terminal and biometric signal recognition data of the user having authority to use the mobile terminal that matches the serial number.

6. The system of claim 5, wherein the VPN server is configured to confirm whether the biometric signal recognition data of the user recognized through biometric signal recognition of the user accessing the robot teaching program matches the serial number of the mobile terminal based on the robot teaching program creation application of the mobile terminal, and only when the serial number of the mobile terminal matches the biometric signal recognition data of the user, allow the user to access the robot teaching program.

7. The system of claim 1, wherein the robot teaching program operation server is connected to a manufacturer server of the robot, and wherein the robot teaching program operation server is configured to provide a robot operation update and a failure response manual in real time from the manufacturer server to the robot teaching program.

8. The system of claim 1, wherein the mobile terminal is provided in plurality, and wherein the robot teaching program operation server is configured to back up and store the robot teaching program in each of the plurality of mobile terminals in real time.

9. The system of claim 1, wherein the robot is provided in plurality, and wherein the robot teaching program operation server is configured to, based on a robot teaching program being newly created or modified, automatically update and manage the change history regarding that multiple users create or modify the robot teaching program and whether the robot teaching program of the plurality of robots is changed.

10. The system of claim 1, wherein the robot teaching program operation server is configured to:

detect the role assigned to the user through matching biometric signal recognition data; and determine whether to activate a creation or modification menu of the robot teaching program based on the detected role.

11. A method of operating the robot teaching system of claim 1, the method comprising:

based on a biometric signal of the user being recognized by the mobile terminal, determining whether a serial number assigned to the mobile terminal matches biometric signal recognition data of the user;

activating the robot teaching program based on the serial number and the biometric signal recognition data matching each other; and based on the user selecting a target robot through the robot teaching program creation application of the mobile terminal and selecting a creation or modification menu of the robot teaching program for the target robot, creating or modifying the robot teaching program for the target robot in the robot teaching program operation server.

12. The method of claim 11, further comprising automatically storing the change history of the robot teaching program created or modified in the robot teaching program operation server, wherein the change history includes a date and contents of the creation or the modification of the robot teaching program, and information on the user who creates or modifies the robot teaching program.

13. The method of claim 12, further comprising automatically backing up and storing the change history in at least one of mobile terminals.

14. The method of claim 13, further comprising transmitting and storing a created and modified final version of the robot teaching program to the mobile terminals and robot control panels.

15. The method of claim 11, wherein the activating of the robot teaching program comprises:

detecting the role assigned to the user who is allowed to access the robot teaching program through matching the biometric signal recognition data; and determining whether to activate the creation or modification menu of the robot teaching program based on the detected role.

16. The method of claim 15, further comprising activating the creation or modification menu of the robot teaching program based on the role of the user being detected as the teaching expert.

17. The method of claim 11, wherein the robot control panel of the target robot and the mobile terminal are connected through a VPN server dedicated to teaching.

18. The method of claim 11, further comprising providing a robot operation update and a failure response manual in real time from a manufacturer server of the target robot to the robot teaching program.

19. The method of claim 11, further comprising monitoring an operating state of the target robot in real time through a network camera connected to the mobile terminal.

20. A robot teaching system, comprising:

a robot control panel connected to a robot;

a mobile terminal installed with a robot teaching program creation application based on a robot teaching program for teaching the robot;

a virtual network server wirelessly connecting the mobile terminal and the robot control panel; and a robot teaching program operation server configured to operate and manage the robot teaching program, wherein the virtual network server includes a virtual private network (VPN) server dedicated to robot teaching, wherein the VPN server is configured to store a serial number of the mobile terminal and biometric signal recognition data of a user having authority to use the mobile terminal that matches the serial number, wherein the VPN server is configured to confirm whether the biometric signal recognition data of the user recognized through biometric signal recognition of the user accessing the robot teaching program matches the serial number of the mobile terminal based on the robot teaching program creation application of the mobile terminal, and only when the serial number of the mobile terminal matches the biometric signal recognition data of the user, allow the user to access the robot teaching program, and wherein the robot teaching program operation server is configured to assign a role with specific work authority to each user having authority to access the mobile terminal, wherein the role is selected from a teaching expert having authority to create and modify the robot teaching program and to inquire a change history of the robot teaching program and a robot operation error occurrence status, a middle manager having authority to inquire the change history of the robot teaching program and the robot operation error occurrence status, and a field worker having only authority to inquire the robot operation error occurrence status.

* * * * *